(12) United States Patent
Koselka et al.

(10) Patent No.: US 9,802,316 B2
(45) Date of Patent: Oct. 31, 2017

(54) COMPLIANT TOUCH SENSOR

(71) Applicant: Vision Robotics Corporation, San Diego, CA (US)

(72) Inventors: Harvey Koselka, Trabuco Canyon, CA (US); Bret Wallach, San Diego, CA (US); Andrew Ferencz, Southborough, MA (US); Richard Wight, Ramona, CA (US)

(73) Assignee: Vision Robotics Corporation, San Diego, CA (US)

( * ) Notice: Subject to any disclaimer, the term of this patent is extended or adjusted under 35 U.S.C. 154(b) by 0 days.

(21) Appl. No.: 14/997,307

(22) Filed: Jan. 15, 2016

(65) Prior Publication Data
US 2017/0203440 A1    Jul. 20, 2017

(51) Int. Cl.
| | | |
|---|---|---|
| *G01L 1/14* | (2006.01) | |
| *B25J 9/16* | (2006.01) | |
| *G01L 1/24* | (2006.01) | |
| *G01L 1/25* | (2006.01) | |
| *B25J 13/08* | (2006.01) | |

(52) U.S. Cl.
CPC ............ *B25J 9/1676* (2013.01); *B25J 13/085* (2013.01); *G01L 1/142* (2013.01); *G01L 1/24* (2013.01); *G01L 1/25* (2013.01)

(58) Field of Classification Search
CPC ....... B25J 9/1676; B25J 13/085; G01L 1/142; G01L 1/24; G01L 1/25
USPC .................................................. 73/862.381
See application file for complete search history.

(56) References Cited

U.S. PATENT DOCUMENTS

| | | | |
|---|---|---|---|
| 4,584,625 A | 4/1986 | Kellog | |
| 4,814,562 A * | 3/1989 | Langston | ................. G01L 1/24 |
| | | | 250/227.14 |
| 7,609,178 B2 | 10/2009 | Son et al. | |
| 8,266,971 B1 * | 9/2012 | Jones | ...................... G01L 1/146 |
| | | | 73/862.046 |

(Continued)

OTHER PUBLICATIONS

User Manual "Getting Started with CapSense", Cypress Perform, Document No. 001-64846, 2010-2016, 132 pages.

*Primary Examiner* — Lisa Caputo
*Assistant Examiner* — Nathaniel T Woodward
(74) *Attorney, Agent, or Firm* — Arc IP Law, PC; Joseph J. Mayo

(57) ABSTRACT

A sensor that detects contact using compression of a compliant material sandwiched between an electromagnetic signal transmitter and a corresponding signal receiver. Potential applications include inexpensive, robust collision sensors integrated into mobile robot bumpers, and sensors on robot grippers to detect grasping of an object. Deformation of the compliant material in response to contact forces changes the distance between the transmitter and the receiver, affecting the electromagnetic field between them. Changes in this electromagnetic field provide information on the location and magnitude of the contact forces. A transmitter and receiver may form opposing surfaces of a capacitor; the measured capacitance changes as the distance between transmitter and receiver changes. Alternatively, the strength of a received signal may be monitored to detect changing distance between transmitter and receiver. Shielding and signal filtering may be used to mitigate the effects of electromagnetic noise.

19 Claims, 16 Drawing Sheets

(56) References Cited

U.S. PATENT DOCUMENTS

| | | | | |
|---|---|---|---|---|
| 8,915,151 | B2* | 12/2014 | Choi | H01H 13/85 200/330 |
| 8,919,211 | B1* | 12/2014 | Hanson | G01L 1/146 73/862.626 |
| 2006/0132332 | A1* | 6/2006 | Ono | G06F 3/044 341/33 |
| 2006/0196702 | A1* | 9/2006 | Hansen | G01G 7/06 177/210 C |
| 2009/0018700 | A1* | 1/2009 | Okamoto | B25J 13/083 700/260 |
| 2011/0096025 | A1* | 4/2011 | Slobodin | G06F 3/044 345/174 |
| 2012/0188200 | A1* | 7/2012 | Roziere | G06F 3/044 345/174 |
| 2012/0281018 | A1* | 11/2012 | Yamamoto | G06F 1/1626 345/634 |
| 2012/0319937 | A1* | 12/2012 | Lee | G06F 1/169 345/156 |
| 2013/0082763 | A1* | 4/2013 | Inada | G01L 1/146 327/517 |

* cited by examiner

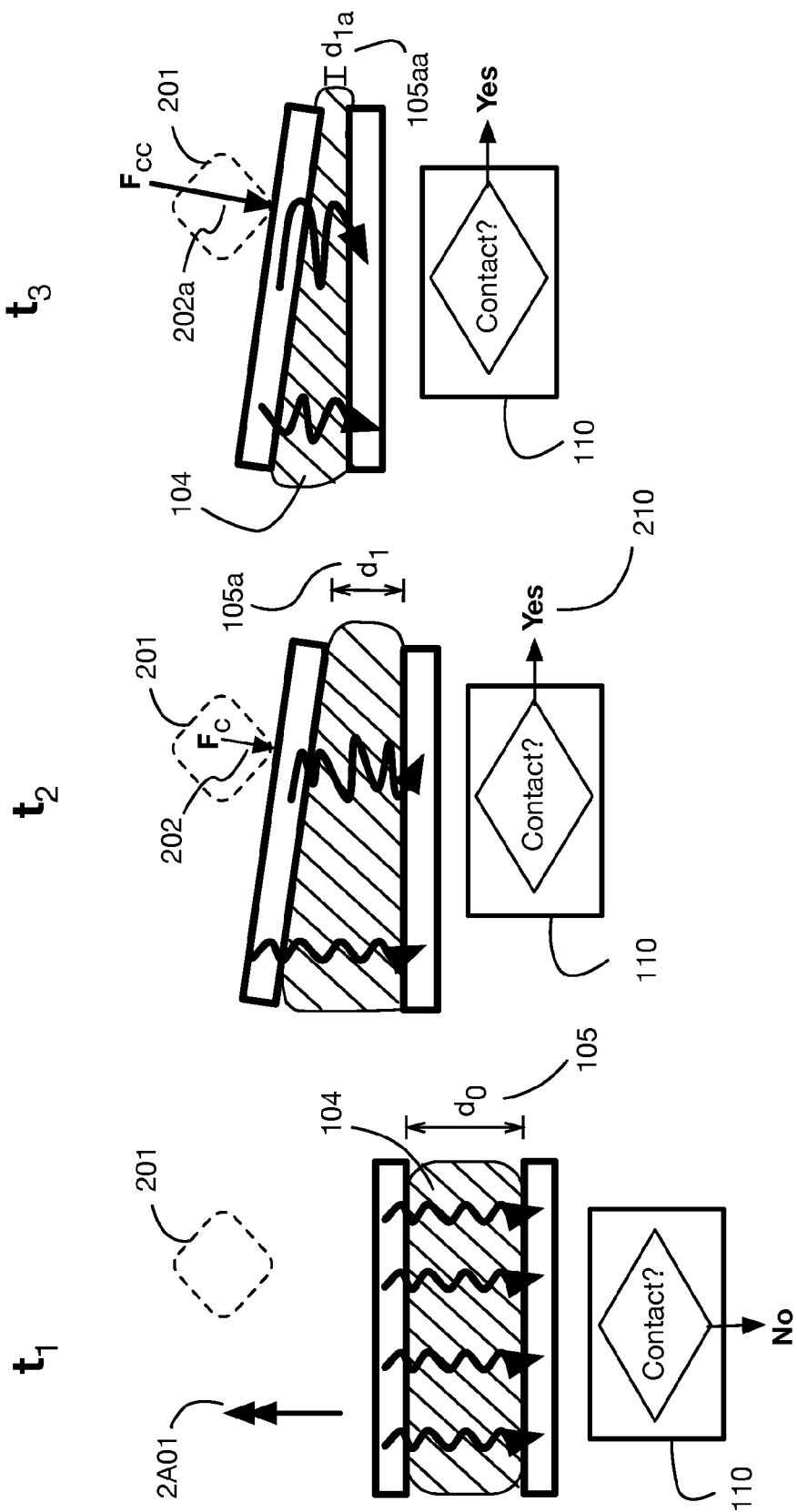

COMPLIANT TOUCH SENSOR

BACKGROUND OF THE INVENTION

Field of the Invention

One or more embodiments of the invention are related to the field of sensors for contact detection or for collision detection, for example between a robot bumper and the environment. More particularly, but not by way of limitation, one or more embodiments of the invention enable a compliant touch sensor.

Description of the Related Art

Collisions between moving objects are inevitable and are sometimes desired. In most situations it is desirable to minimize damage caused by collisions. The best ways to minimize damage are to detect a collision and implement corrective action as soon as possible, and to use bumpers or other features to absorb the impact. Sensors for collision detection are of particular importance for applications such as robotics where computers control or may override human control of the motion and can react almost instantaneously upon the sensing of contact. Collision sensors may also be used in non-robotic applications including, but not limited to human controlled vehicles or appliances when there is a computer override in the case of a collision, or simply to provide early feedback to the operator.

The need to detect collisions and minimize the resulting damage has long been recognized. Several solutions are known in the art.

Some bumpers have mechanical switches that can detect motion or deformation. Designs for these bumpers involve tradeoffs between stiffness, mechanical compliance, sensitivity and coverage. In general, larger bumpers with significant coverage are inherently stiffer and less sensitive. Large bumpers are required for robots operating in typical home or office environments, since robots may encounter obstacles at arbitrary heights. For example, on most robot vacuum cleaners the entire front surface is a hard spring loaded bumper. The large size results in a relatively stiff bumper. Also, depending on the mechanical design it may be hard to sense small areas in order to provide feedback for where the collision occurred. Corners are also a problem for mechanical bumpers but are critical in practice because obstacles are often struck when a moving system tries to pass closely beside an object.

Strain gages, pressure sensitive sheets, and similar systems are often very sensitive, but typically have very little compliance. Such systems are employed on robot grippers and give feedback for how much pressure these mechanical hands are applying to an object. However, the low compliance of these systems makes them unsuitable for many applications. Resistive solutions are known to exist that provide variable resistance sensors for measuring forces and minimizing displacement.

Forward-looking non-contact sensors such as ultrasonic, LASER, time-of-flight and LIDAR have significant compliance (distance traveled after detection before damage) because they are non-contact and detect obstacles at a distance. However, these systems are not 100% reliable; therefore mobile robots that include these sensors almost always include backup mechanical sensor/bumper combinations. These systems perform very poorly or not at all when sensing objects that are close. This presents problems for systems that are intended to operate in tight areas, such as a robot vacuum cleaner that is intended to get as close to walls and obstacles as possible, or robot arms that are to work side-by-side with people. Higher quality non-contact sensors are also typically expensive.

Sensor such as laser line breaks and laser curtains have a transmitter and receiver that detect when an object blocks the line of sight between the two. These systems can work well for stationary obstacles such as walls or doorways, but they do not provide a general-purpose collision detection solution.

In summary, each of the contact sensing solutions known in the art involve tradeoffs between coverage, reliability, and compliance. There are no known contact sensing solutions that provide very high reliability, high compliance for a soft impact, fast reaction to sense contacts quickly when they occur, and coverage of a large surface area.

For at least the limitations described above there is a need for a compliant touch sensor.

BRIEF SUMMARY OF THE INVENTION

One or more embodiments described in the specification are related to a compliant touch sensor. Embodiments of the invention use one or more transmitters and receivers on either side of a compliant medium; they detect contact using the changes in electromagnetic signals caused by changes in distance between the transmitter and the receiver. This configuration enables touch sensing with soft, compliant, and highly responsive sensors.

Advantages of the compliant touch sensor described in this invention include: (1) very low inertia; (2) very low compressive force, especially in local areas; (3) very quick sensing of collisions; (4) significant over travel after collision is sensed, unlike resistive sensors that minimize displacement for example; (5) sensors can cover large areas; (6) sensors can be of arbitrary shapes, and may for example be placed around corners; (7) sensors may be broken into multiple sensing zones to localize the contact force; (8) no dead zones; (9) very high reliability and robustness; (10) low manufacturing cost.

One or more embodiments enable a compliant touch sensor that comprises a signal transmitter, a signal receiver, a compliant layer between them, and a signal analyzer connected to either or both of the transmitter and the receiver. The signal transmitter emits an electromagnetic signal. The signal analyzer receives signals that depend on one or more attributes of the electromagnetic field at the transmitter, the receiver, or both. These attributes are affected by the distance between the signal transmitter and the signal receiver. When the sensor contacts an external object, either directly or because it is coupled to another surface that contacts the object, the compliant layer deforms and the distance between the transmitter and the receiver changes. This change in distance generates changes in the electromagnetic field, which are detected by the signal analyzer.

The sensor may also detect movement of an object it is in contact with, including but not limited to shear movement of the object relative to the sensor. For example, when an object such as a piece of cloth, a piece of paper, or a book is pinched between the sensor and another object and the object is pulled sideways, the sensor may detect this load. The shear motion of the object relative to the sensor may for example change the orientation of the signal transmitter relative to the signal receiver (for example by creating a shear motion between them), which thereby changes the electromagnetic field between them. An embodiment with a sensor that detects shear movement and shear load may be used for example in a sewing application where it is beneficial to sense when the fabric is stretching.

The compliant layer may be for example a dielectric material. It may comprise materials such as foam, rubber, air, plastic, or springs. It may be of any size, shape, and thickness. In one or more embodiments the compliant layer may be designed to absorb some or all of the impact energy from contact with an external object.

In one or more embodiments the compliant layer may be configured to provide over travel after detection of a contact. For example, a contact may be detected when the separation distance between the signal transmitter and the signal receiver reaches a detection distance; increases in contact forces beyond this point may further compress the compliant layer, reducing the separation distance below the detection distance. This over travel feature of the sensor may provide protection to equipment on which the sensor is installed, or to objects that this equipment touches or holds. For example, in one or more embodiments the sensor may be installed on a mobile robot bumper. The compliant layer in the sensor may compress when the bumper contacts an obstacle such as a wall, triggering contact detection. Because the robot control system may not respond immediately to stop or reverse motion of the robot, additional movement may occur after the contact detection. The compliance in the compliant layer beyond the detection distance provides an additional buffer to allow this continued motion without damaging the robot. Another example is an embodiment with the sensor installed in a gripper of a robot arm. If the gripper closes to grab an object, the robot control system may not respond immediately to stop or reverse this closing motion when contact is detected. Compliance in the sensor beyond the contact detection distance allows the closing motion to continue without damaging the object being gripped.

The signal analyzer may derive qualitative and quantitative information directly based on compression and also indirectly based on contact forces that cause that compression given a values of the compressive material in the compliant layer, from the changes in the electromagnetic field resulting from deformations of the transmitter, receiver, or compliant layer. For example, it may calculate one or more of a location or locations of the compression, the magnitude of the compression and/or force, the direction of the compression and/or force, and the separation distance or distances between the signal transmitter and the signal receiver. It may monitor and analyze the electromagnetic signal continuously to sense changes directly in compression or separation, and thus indirectly in contact forces as they occur.

One or more embodiments may use any attributes of the electromagnetic field at or between the signal transmitter and the signal receiver, or any values derived from the field. For example, one or more embodiments may measure the capacitance between the signal transmitter and the signal receiver. This capacitance typically depends on the distance between the transmitter and the receiver. The signal analyzer may calculate the distance by measuring the capacitance, and compare this distance to a baseline separation distance when there is no contact; contact may be detected if the calculated distance differs from the baseline separation distance by an amount greater than a specified threshold. One or more embodiments may measure capacitance between the transmitter and receiver using a series RC circuit that includes the transmitter/receiver capacitor, a resistor, and a voltage source. The time constant of this RC circuit may be measured by applying a known change to the voltage source and measuring the time delay for the voltage across the capacitor to reach a target voltage level. The capacitance may then be calculated from this time constant and from the resistance of the resistor.

One or more embodiments may calculate the distance between the transmitter and the receiver from the received signal strength at the receiver. With a known or measurable transmitted signal strength, the received signal strength generally varies inversely with the distance between the transmitter and the receiver. Contact may be detected from a change in the received signal strength compared to a baseline reference value, or compared to a moving average calculated when the sensor is not in contact with another object. Embodiments may use transmitted signals in any frequency band, including for example, without limitation, radio waves, microwaves, visible light waves, infrared light waves, ultraviolet light waves, and X-rays.

Embodiments that use received signal strength to detect contact may be susceptible to electromagnetic noise that corrupts the received signal. To eliminate or reduce the effects of noise, one or more embodiments may use a transmitted signal of a known frequency, and apply a band-pass filter to the received signal to reject noise that is outside the desired frequency band. One or more embodiments may mitigate noise by adding a conductive shielding layer or layers. The shield may block noise from reaching the signal transmitter or the signal receiver, or it may attenuate this noise. One or more embodiments may include an insulating layer between the shield and the transmitter and receiver.

One or more embodiments may use multiple signal transmitters, multiple signal receivers, or both, to divide a sensing area into multiple zones. The signal analyzer may then detect the location of a contact force by combining the signals from the multiple transmitters and multiple receivers. Embodiments may use various configurations to provide multiple sensing zones. For example, one or more embodiments may use a single signal transmitter that sends signals to multiple signal receivers. One or more embodiments may use a separate signal transmitter for each signal receiver.

One or more embodiments may integrate the compliant touch sensor or any of its components into any device. For example, one or more embodiments may integrate the sensor into a device that moves or that has moving components. In addition, one or more embodiments may integrate the sensor or any of its components into an obstacle, barrier, or object that may be contacted by a moving device. Devices with moving components may have actuators that control the motion of these components; in one or more embodiments the signal analyzer of the sensor may send contact detection or contact force information to the control system for these actuators. Devices may be controlled by an operator, controlled automatically using hardware or software, or controlled via a combination of operator input and automated control. In one or more embodiments information from the signal analyzer may be transmitted to a display viewed by an operator. The operator may for example use this information to determine when the device being controlled has contacted an object or a barrier.

In one or more embodiments a human operator may provide commands to control the actuators of a device, and the device may have an automated override that uses information from the compliant touch sensor to override the operator's commands. For example, one or more embodiments may use the sensor in conjunction with an emergency stop feature that automatically stops the device or some of its actuators under certain conditions detected by the compliant touch sensor.

One or more embodiments may integrate all or portions of the compliant touch sensor into a robot, which may be either a mobile robot or a stationary robot with moving components. One or more embodiments may integrate the compliant touch sensor into bumpers of a mobile robot, for example. Contact information from the sensor or sensors may be sent to a control system for the mobile robot, enabling the robot to navigate around obstacles or to recover from collisions. Bumpers with multiple sensing zones may be used to provide detailed information on which zone or zones are in contact with an external object such as an obstacle.

One or more embodiments may integrate the compliant touch sensor into a robot arm of a stationary or mobile robot. In these embodiments the sensor may for example indicate when the gripper of a robot arm makes contact with an object, or indicate the force with which the gripper is holding an object. One or more embodiments may integrate the compliant touch sensor into a robot arm, for example to detect inadvertent contact as the arm executes a positioning sequence. For example, one or more embodiments may place a sleeve of sensors around a robot arm to sense any contact between the surfaces of the arm and the environment.

BRIEF DESCRIPTION OF THE DRAWINGS

The above and other aspects, features and advantages of the invention will be more apparent from the following more particular description thereof, presented in conjunction with the following drawings wherein:

FIG. 2A shows further compliance of the sensor of FIG. 2 after detecting contact with an object.

DETAILED DESCRIPTION

A compliant touch sensor will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
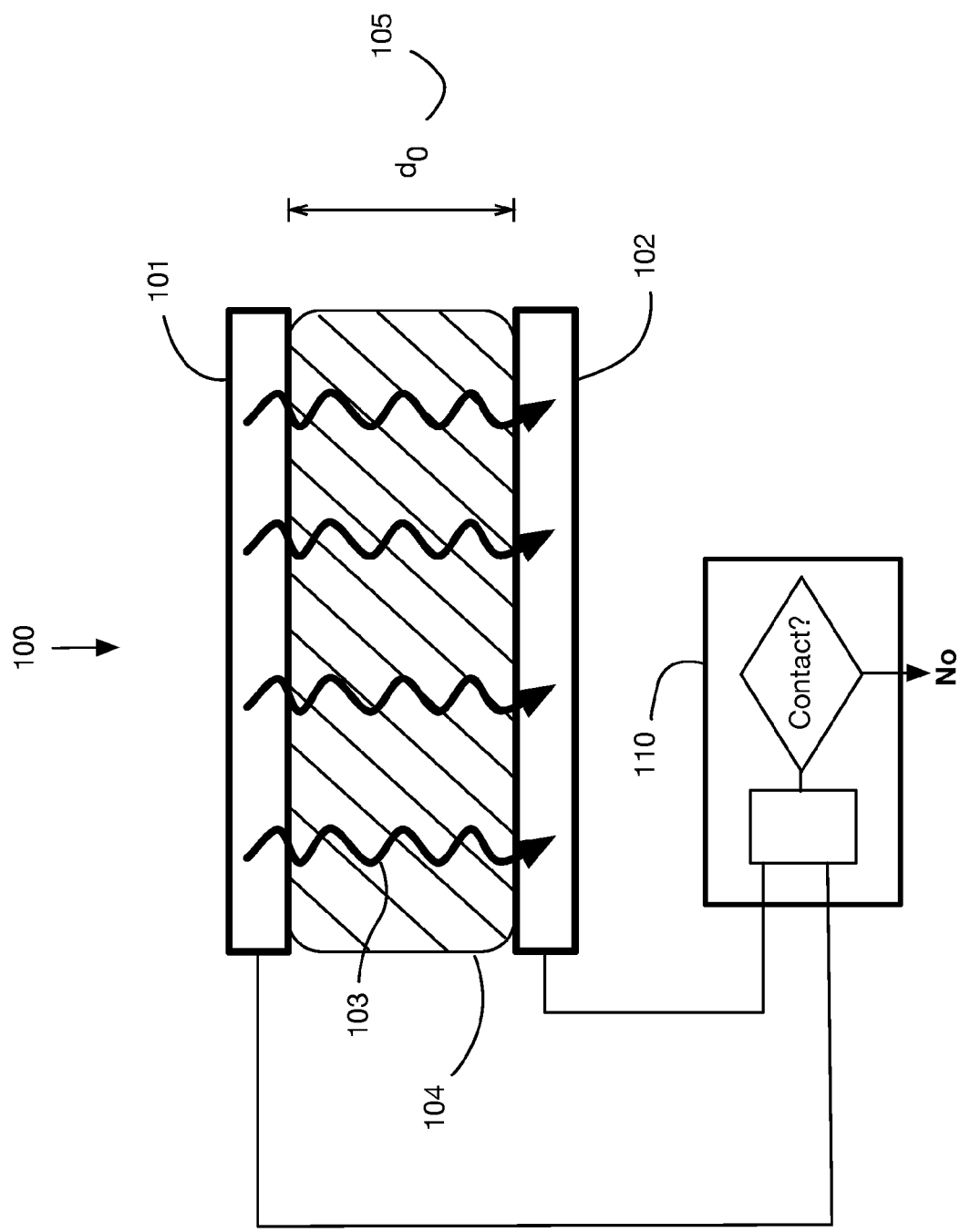
FIG. 1 illustrates an embodiment of the invention comprising a transmitter and receiver separated by a compliant material, and a signal analyzer that determines whether contact has been detected.

FIG. 1 illustrates an embodiment of the invention that detects contact between the sensor and an object wherein the sensor includes a compliant sensor that compresses readily with minimal force, using a transmitter and a receiver coupled by an electromagnetic field. Sensor 100 includes a signal transmitter 101 and a signal receiver 102. Electromagnetic field 103 is generated between the transmitter 101 and the receiver 102. Embodiments may use any type of electromagnetic field, including for example static electric or magnetic fields, or electromagnetic radiation of any desired frequency, amplitude, phase, or pattern. Transmitter 101 and receiver 102 may be of any size, shape, and material. For example, they may contain conductive material designed to generate or receive electromagnetic radiation, or to hold or transmit electric charge. The transmitter and receiver may for example be in the form of straight or curved wires, coiled or spiral wires, wire meshes, metal tape or sheets, metal foils, conductive fabric or plastic, conductive ink painted on solid or rigid parts, antennas, surfaces, plates, or any other desired shape or material. They may be rigid or flexible, or partially flexible. They may wrap around corners or around any protrusion or indentation. They may be in any relative orientation and separated by any distance or distances. In general, the optimal distance between the transmitter and the receiver may depend on the size and shape of the transmitter and the receiver. In one or more embodiments the transmitter and receiver may be located relatively close to one another, for example separated by less than one or two centimeters. A compliant material layer 104 is located between transmitter 101 and receiver 102. This layer deforms when a force is applied to the transmitter or to the receiver, or to other surfaces in contact with the layer, changing the distance between the transmitter and the receiver and thereby modifying the electromagnetic field 103. The compliant material may be for example air, soft foam, rubber, plastic, a flexible honeycomb pattern, springs, or any other structure or material that can deform upon the application of an external force. In general, the compliant sensor for example may be configured to enable high compression with low contact force. Compliant materials may be quantitatively measured using a 50 square inch disk that is placed on the material. The amount of weight that is required to cause a 25% indentation in a 4-inch thick piece of foam is the 25% Indentation Load Deflection (ILD) rating otherwise termed ILD for short. In one or more embodiments the compliant layer may have an ILD of 0-10 ILD, 10-15 ILD, 15-20 ILD, 20-40 ILD, 40-70 ILD, or any other value so long as the compliant sensor is able to detect compression of the compliant material. The sensor may be installed in an orientation that allows either or both of the transmitter or the receiver to contact an external object, or to move relative to each other when another surface contacts an external object.

In the embodiment shown in FIG. 1, transmitter 101 and receiver 102 are separated by a normal distance 105 when there is no contact with an external object. The electromagnetic field at the transmitter, the receiver, or both, is measured and monitored by a signal analyzer 110. The signal analyzer uses the monitored signals to determine whether a displacement occurs between the transmitter and the receiver. For example, an external force may cause a change in the distance 105, which modifies the electromagnetic field 103, resulting in detection of a contact. The signal analyzer 110 may receive and analyze any value or values associated with the electromagnetic field 103. For example, without limitation, it may analyze field strength (of the electric field, the magnetic field, or both), voltage, current, charge, flux, frequency, amplitude, energy flow, inductance, capacitance, resistance, or heating. These values may be analyzed from any location on the transmitter, the receiver, or both, or from any location between the transmitter and the receiver. The signal analyzer may comprise any combination of hardware and software. In one or more embodiments the signal analyzer may be implemented as a special purpose analog or digital circuit. In one or more embodiments the signal analyzer may comprise a processor such as for example a microprocessor, with software running on the processor to analyze the signals. The signal analyzer may use any combination of analog and digital signal processing. In one or more embodiments the signal analyzer may use analog to digital converters to digitize the signals, and then process the signals using digital signal processing techniques.

Figure 2:
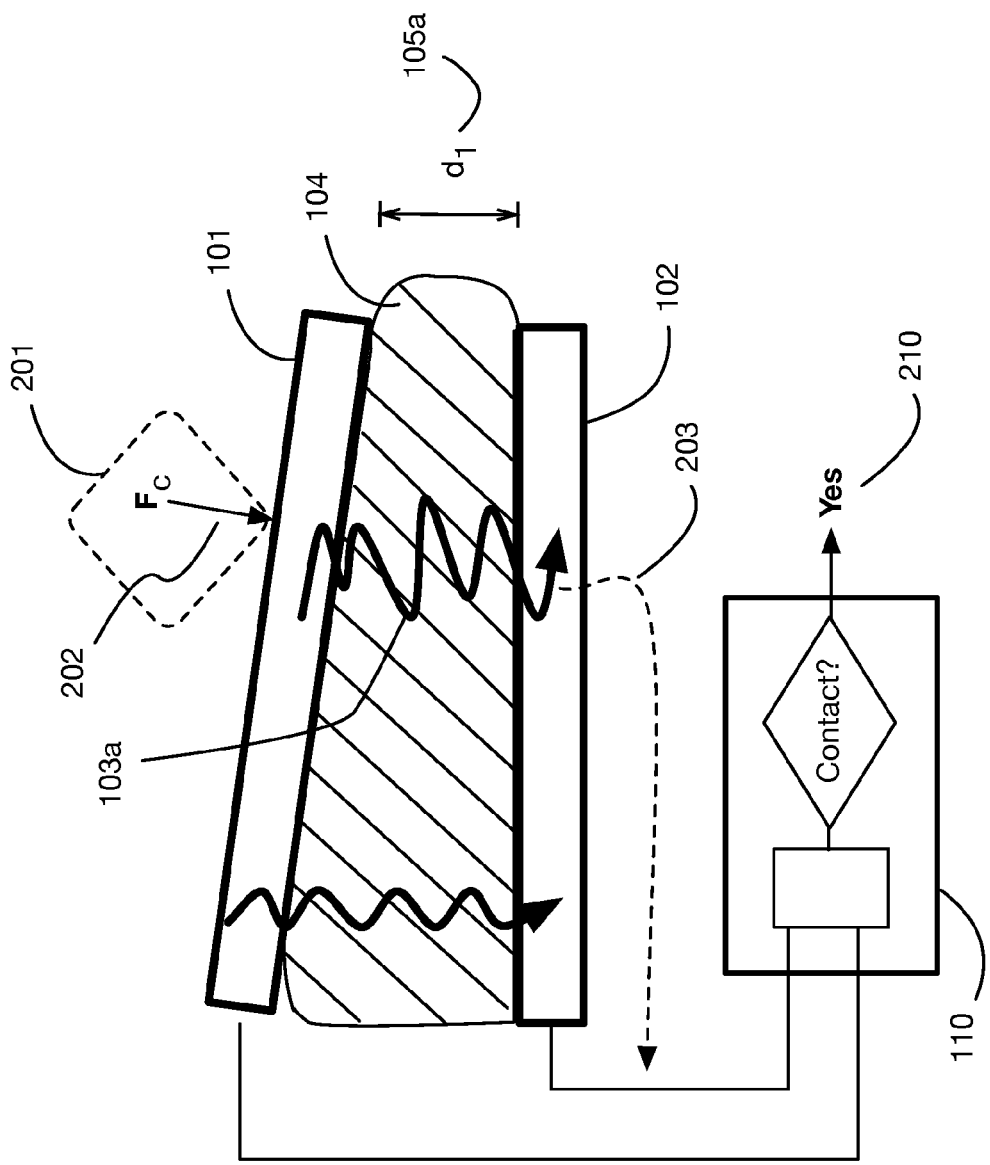
FIG. 2 shows the embodiment of FIG. 1 contacting an object.

FIG. 2 shows the sensor of FIG. 1 making contact with an external object 201. Object 201 applies a force 202 to the sensor. Because layer 104 is compliant, it deforms under the force, changing the distance between transmitter 101 and receiver 102 to a smaller distance 105a. This changes the electromagnetic field to 103a, which is detected as signal 203 by signal analyzer 110. The signal analyzer therefore detects the displacement due to contact force 202 and issues detection signal 210. One or more embodiments may detect the minimum distance between the transmitter and the receiver, the average distance, or any other function of the relative location of the transmitting and receiving surfaces.

One or more embodiments may provide sufficient compliance in the compliant layer to allow over travel after the sensor detects a contact. The compliant layer may deform past the point at which the separation distance between the signal transmitter and the signal receiver reaches a threshold for detection of contact. In some applications this over travel may provide a benefit for example of protecting equipment or personnel since a human operator or an automated control system may not be able to respond immediately to a contact detection signal. FIG. 2A continues the example of FIG. 2 to illustrate an embodiment that provides over travel after the detection of contact. At time $t_1$, the sensor is travelling forward at velocity 2A01 towards stationary object 201. For example, the sensor may be installed on a moving vehicle or a mobile robot. The separation distance 105 between the transmitter and receiver is a baseline separation distance with no deformation of the compliant layer 104. The sensor contacts the object and at time $t_2$ the compliant layer compresses to reduce the distance between the transmitter and the receiver to distance 105a, which triggers a contact detection 210 by signal analyzer 110. The contact detection does not result in an immediate stop to the motion of the sensor (or the vehicle or robot on which it is installed). Therefore, the sensor continues to move forward. The object 201 does not move in this example, therefore the contact force 202 increases to force 202a as the sensor presses harder into the object. At time $t_3$ the compliant layer 104 is further compressed, reducing the separation distance further to 105aa. The additional compliance in layer 104 beyond the contact detection distance 105a provides a margin of safety to allow over travel while a control system (either automated or human) can respond to the contact detection signal 210. In one or more embodiments this additional compliance beyond the detection distance may be valuable for example to protect equipment that the sensor is attached to, to protect the object 201, or to allow time for a control system to determine an appropriate action.

Figure 3:
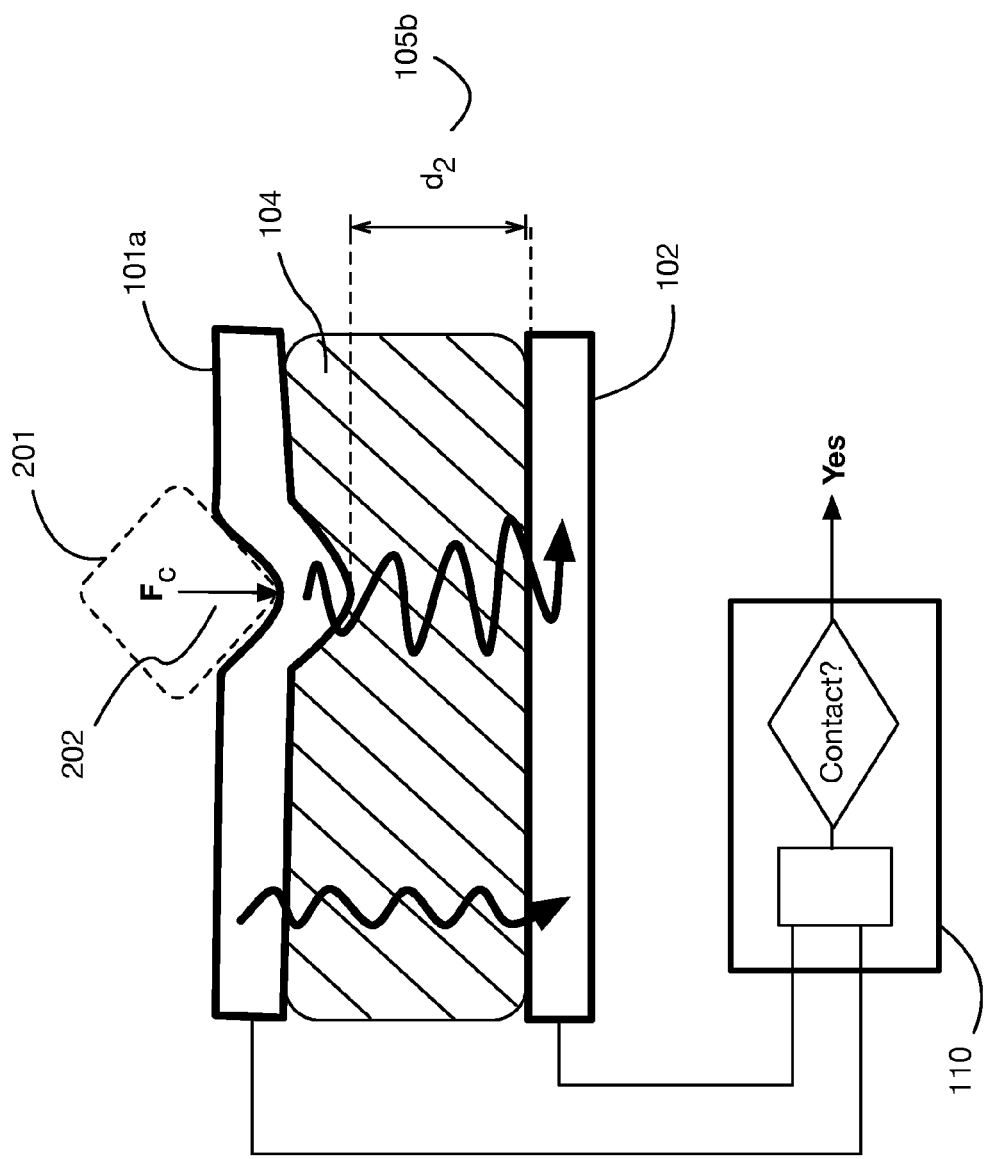
FIG. 3 shows a different embodiment of the invention with a compliant signal transmitter.
Figure 4:
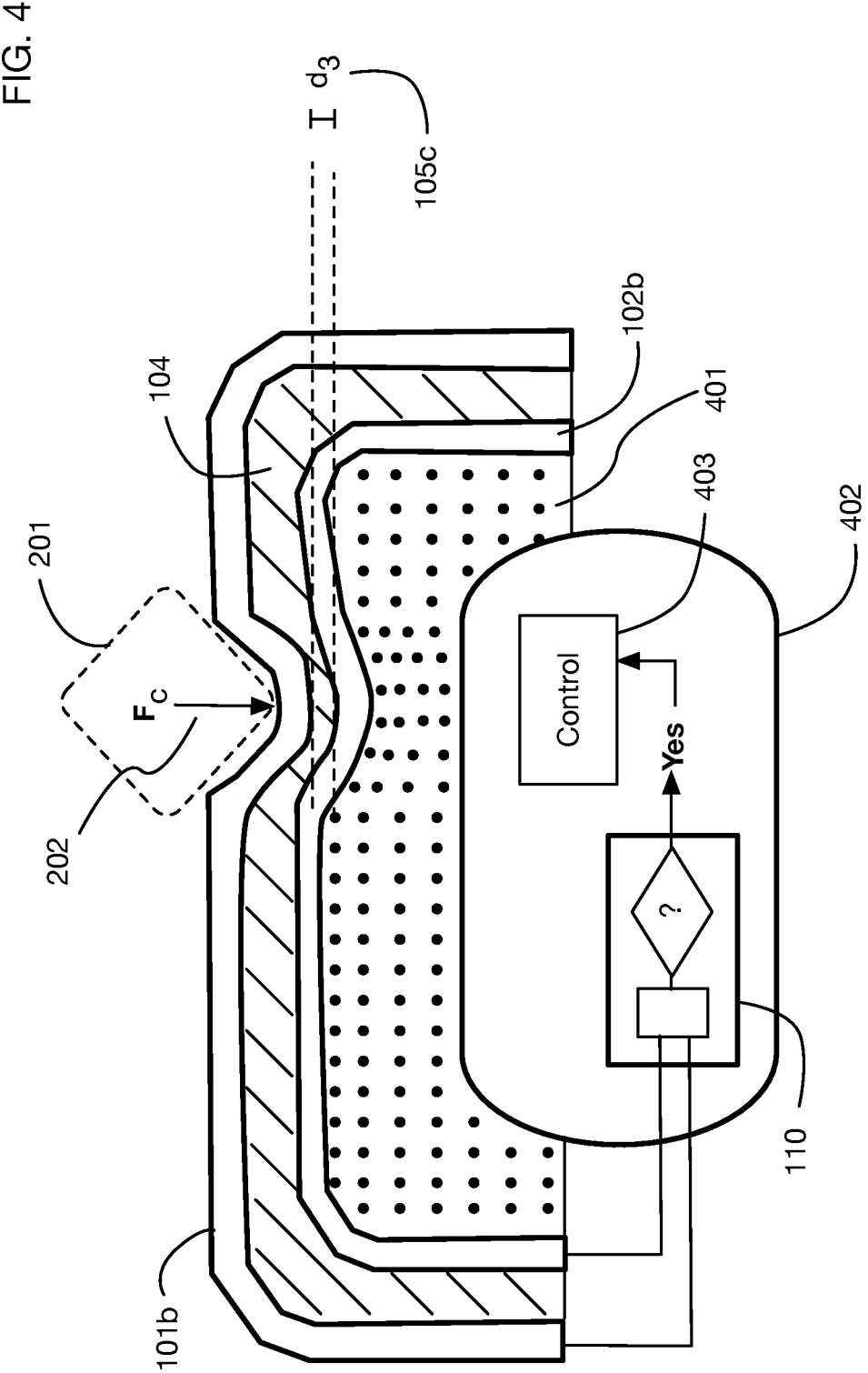
FIG. 4 illustrates an embodiment of the invention with a compliant transmitter and a compliant receiver, and with both surrounding an inner compliant layer that protects an internal object.

In one or more embodiments the signal transmitter, the signal receiver, or both, may also be compliant or flexible. Any signal transmitter or signal receiver that deforms, bends, compresses, stretches, flexes, changes shape or size, is considered compliant. FIG. 3 illustrates an embodiment with a compliant signal transmitter 101a that deforms when contact force 202 is applied to its surface. This also deforms the compliant layer 104 between the signal transmitter 101a and the signal receiver 102, resulting in a reduced distance 105b between them that is detected by signal analyzer 110. FIG. 4 illustrates an embodiment with a compliant signal transmitter 101b and a compliant signal receiver 102b. In this embodiment the signal transmitter and the signal receiver surround an inner compliant layer 401 that surrounds an inner object 402. The compliance in the layers 104 and 401 may serve for example to absorb impact energy from the contact force 202, thereby protecting the inner object 402. The relative stiffness and relative thickness of the inner compliant layer 401 and the outer compliant layer 104 may be adjusted for example to achieve a desired amount of motion between the signal transmitter and the signal receiver for a specified range of contact forces. The object 402 may be for example a vehicle, such as a mobile robot, an automobile, a self-powered vacuum cleaner, or any other object that requires protection against external contact forces. It may be a stationary robot, or an arm or gripper of a stationary or mobile robot. In the example shown in FIG. 4, contact with external object 201 deforms transmitter 101b and receiver 102b, as well as the layer 104 between them, resulting in a reduced distance 105c between the transmitter and the receiver. In this embodiment the signal analyzer 110 is installed in the inner, protected object 402; when the signal analyzer detects contact, it may for example send information to a control system 403 that responds to the contact. For example, if object 402 is a mobile robot, the control system 403 may steer the robot away from obstacle 201 when contact is detected by signal analyzer 110.

Figure 5:
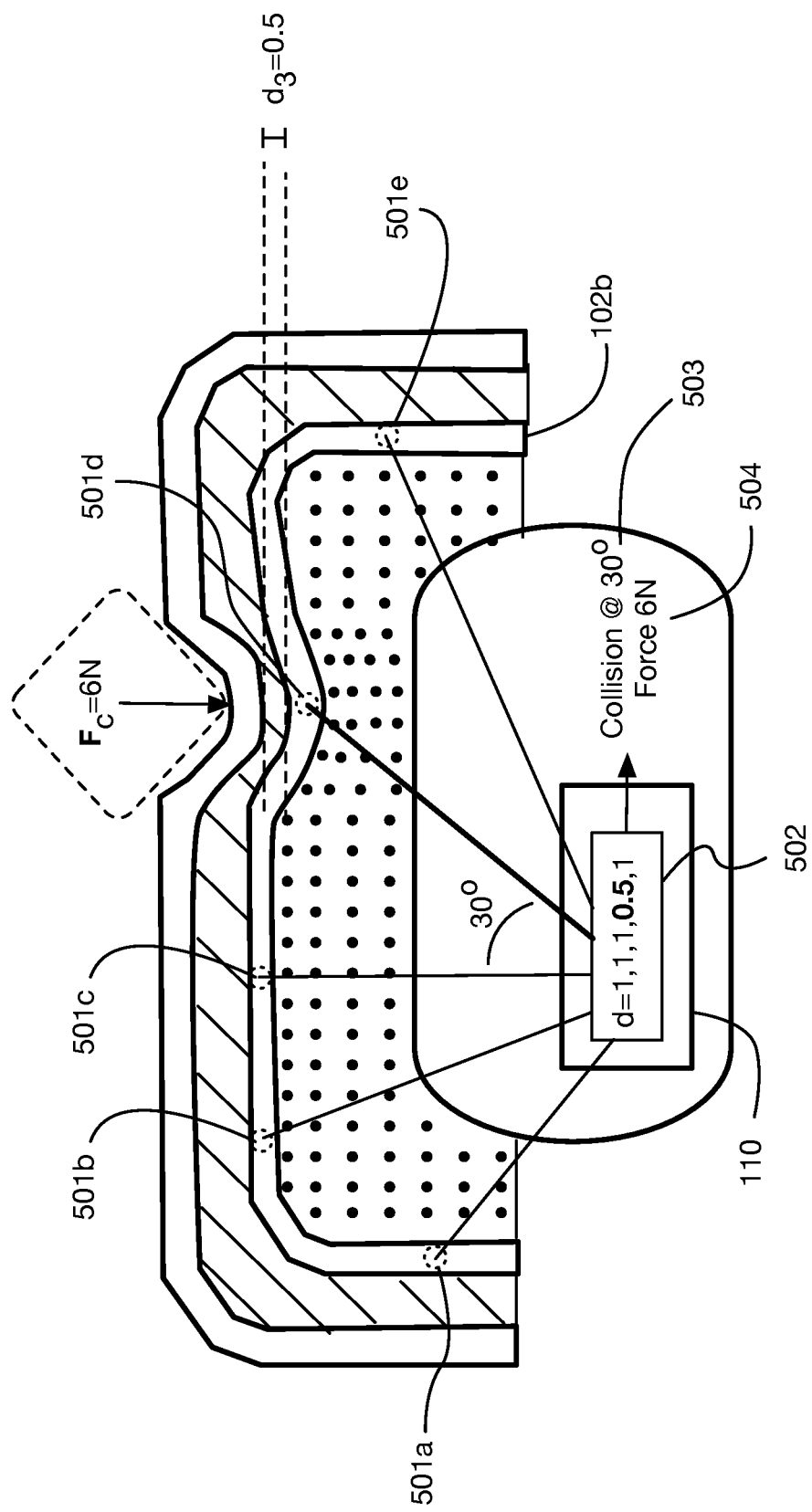
FIG. 5 illustrates an embodiment of the invention that detects the force and location of a contact.

In one or more embodiments the sensor may be configured to calculate additional qualitative or quantitative information about a compression, separation or distance within the compliant layer, with or without calculating a contact force, which in general could be small based on the compliant layer compression characteristic, based on the changes in the electromagnetic field. For example, the information calculated may include the compressed distance between the transmitter and the receiver, the location of the compression, the orientation of the compression, or indirect quantities such as the energy of impact, the momentum of impact, or the force. FIG. 5 illustrates an embodiment that measures attributes of the electromagnetic field at multiple locations on signal receiver 102b. One or more embodiments may measure the field at multiple points on the signal transmitter as well, or at points between the transmitter and the receiver. In this example, for illustration, measurements are obtained at 5 locations 501a, 501b, 501c, 501d, and 501e. For example, these measurements may compare the shape, phase, or amplitude of a signal as it propagates from 501a to 501b, 501c, 501d, and 501e. These measurements are analyzed by signal analyzer 110. The signal analyzer determines the distances 502 between the transmitter and the receiver at each of these 5 locations. Since only one distance differs from the normal distance, the signal analyzer determines the location 503 of the contact force. From the amount of compression, embodiments may optionally also estimate the magnitude 504 of the contact force although this is not required and for extremely compliant materials, may be very low.

Figure 6:
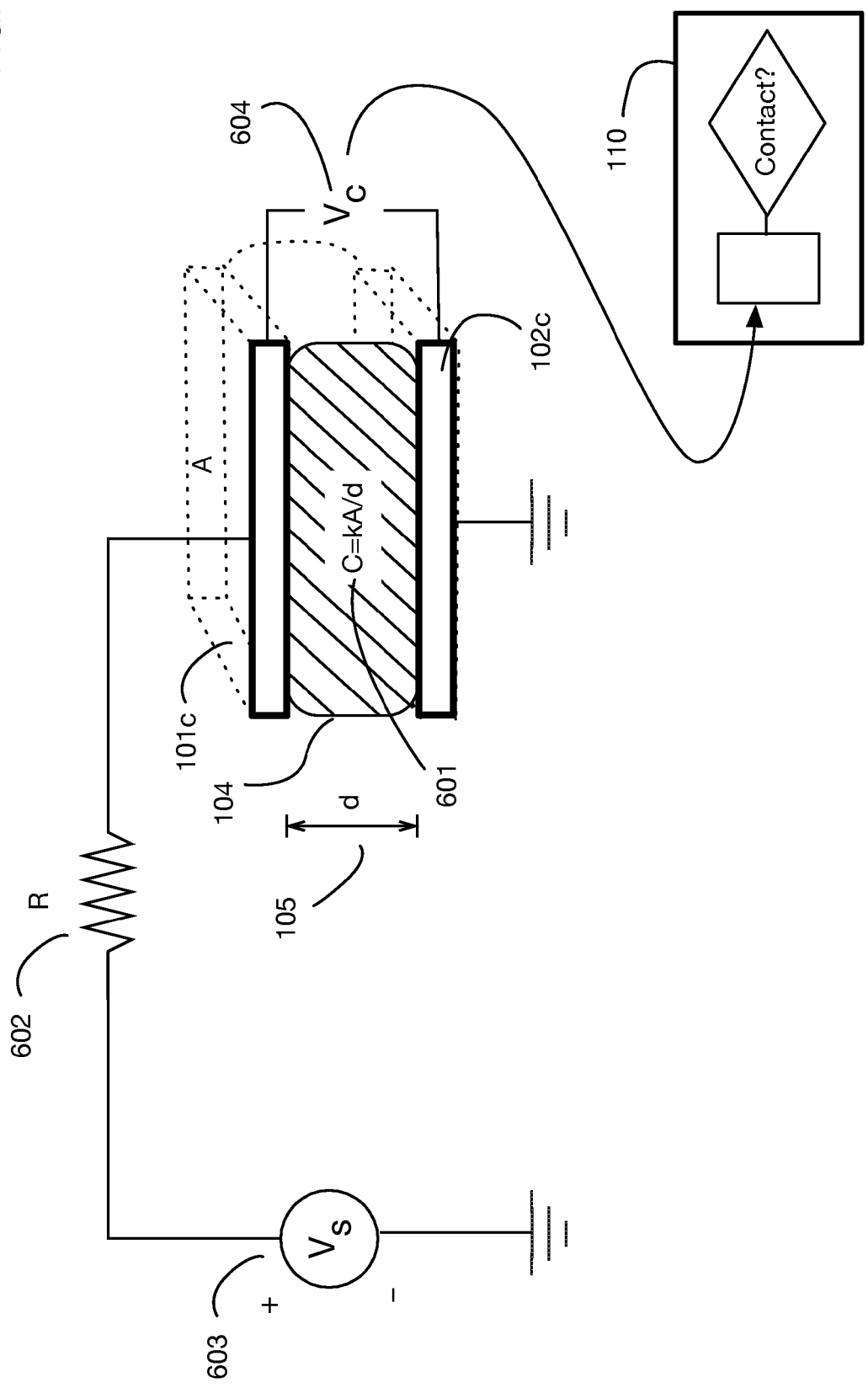
FIG. 6 illustrates an embodiment that uses capacitance between the transmitter and receiver to detect a contact.
Figure 7:
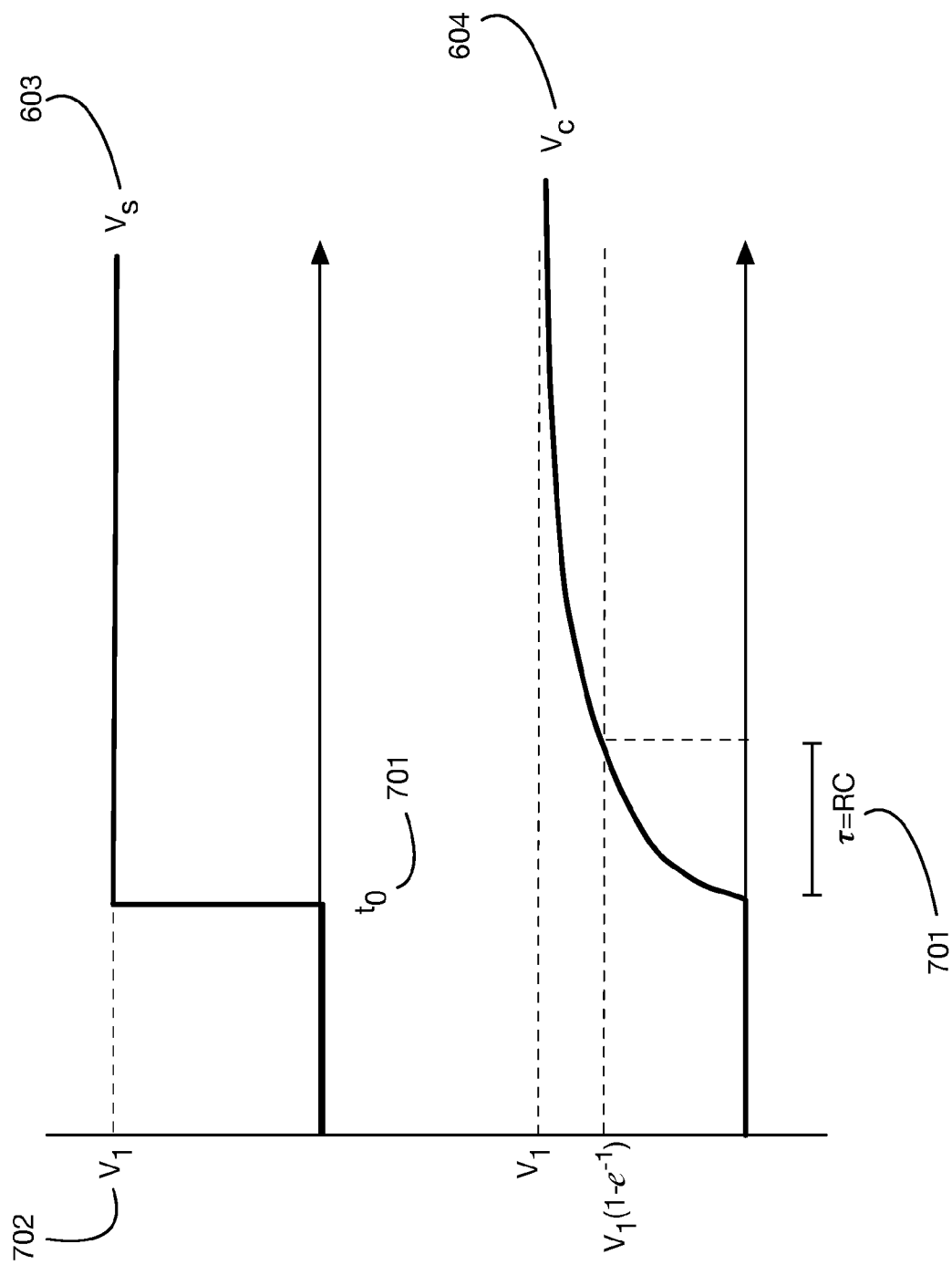
FIG. 7 illustrates a method that may be used by the embodiment of FIG. 6 to determine the capacitance between the transmitter and the receiver.

One or more embodiments may use any attribute of an electromagnetic field or derived from an electromagnetic field, measured at any location at or between the signal transmitter and signal receiver to detect a displacement due to a contact force. FIG. 6 illustrates an embodiment that measures the capacitance between the signal transmitter and the signal receiver to determine the distance between them, and thereby to detect a change in this distance due to a contact force. Signal transmitter 101c and signal receiver 102c form opposing surfaces of a capacitor. For example, if the transmitter and receiver are parallel plates, the capacitance 601 between them is approximately C=kA/d, where A is the surface area of each plate, distance d is the distance 105 between the transmitter 101c and the receiver 102c, and k is a constant that depends on the dielectric constant of the compliant material 104. With a known value of the area A, the distance d can therefore be determined from the capacitance C. Changes in the distance between the transmitter and the receiver can be detected as changes in the capacitance. One or more embodiments may employ more complex formulas that take into account fringe effects on the edges of the plates. One or more embodiments may use formulas, calculations, or table lookups based for example on calibrations of the sensor. For example, a calibration may be performed to derive an empirical curve relating capacitance C to the distance d; the distance can then be determined from the capacitance during sensor operation using a lookup or interpolation of this empirical curve. One or more embodiments may use any desired method to measure the capacitance C, and thereby to determine the distance d or to detect changes in the distance d. FIG. 6 illustrates an embodiment that embeds the transmitter and receiver into an RC (resistor-capacitor) circuit. This illustrative circuit puts resistor 602 and voltage source 603 in series with the capacitor formed between the transmitter 101c and the receiver 102c; the receiver 102c is also tied to ground. The voltage 604 across the capacitor may for example be measured by the signal analyzer 110 to determine the capacitance 601. For example, FIG. 7 illustrates a method that may be used by one or more embodiments to derive the capacitance from the voltage 604. At a particular time 701 the voltage across the voltage source 603 is increased from zero to a value 702. The voltage 604 across the capacitor gradually increases towards the new source voltage value 603. The time delay 701 for the capacitor voltage to reach a fraction $1-e^{-1}$ of the source voltage value 702 is the time constant τ of the circuit, which equals RC, where R is the resistance 602 and C is the capacitance 601. By measuring this time delay, the capacitance C can be calculated from the known value of the resistance 602. This use of a step function to measure the capacitance is illustrative; one or more embodiments may apply any desired signal to the voltage source and derive the capacitance from the resulting voltage signal across the capacitor.

Figure 8:
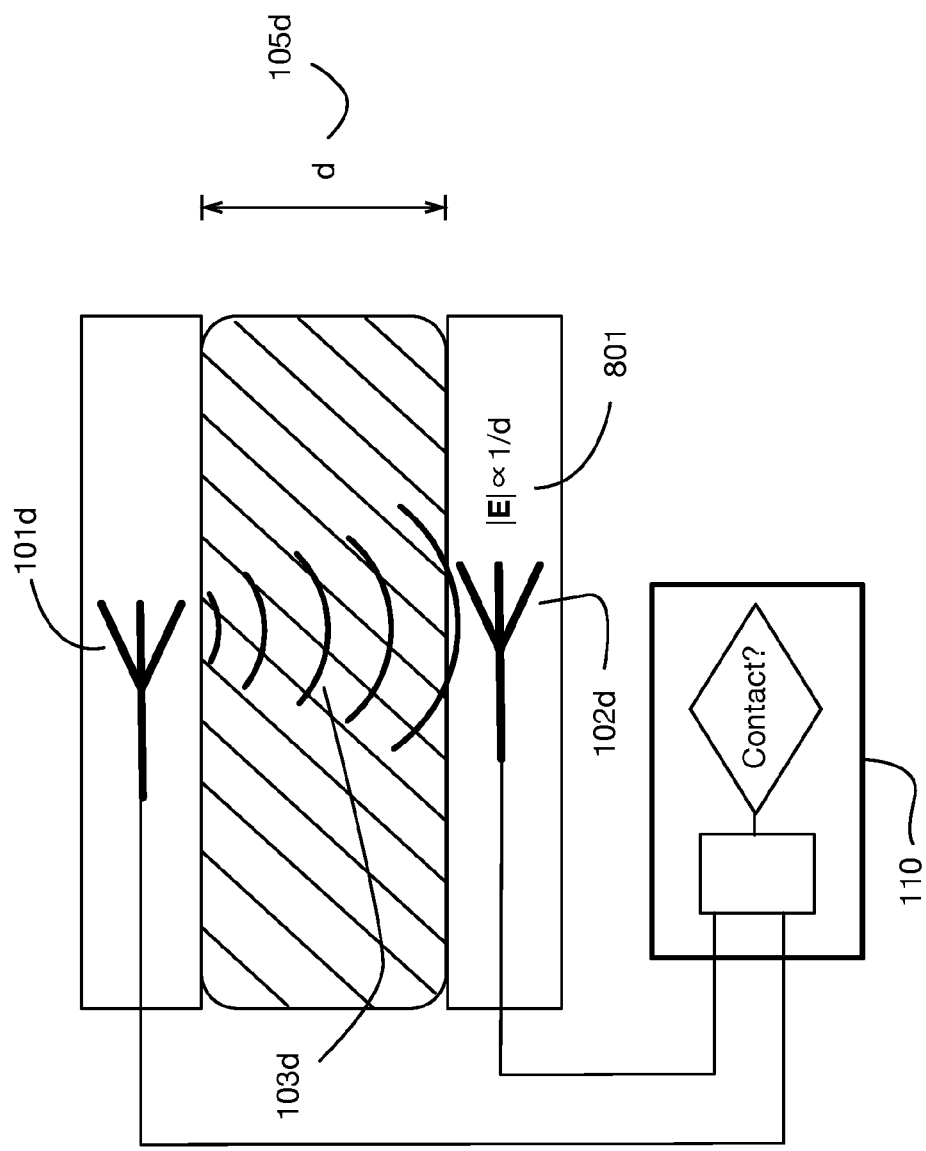
FIG. 8 illustrates an embodiment that uses received signal strength to determine the distance between a transmitter and a receiver, and thereby to detect contact.

One or more embodiments may use the strength of the electromagnetic field at the signal receiver to determine the distance between the signal transmitter and the signal receiver. FIG. 8 illustrates an embodiment in which signal transmitter 101d and signal receiver 102d are antennas. In general, one or more embodiments may use any conductive material as a transmitter or as a receiver, regardless of size, shape or geometry. Any such material may serve as an antenna. A transmitted electromagnetic wave 103d of a known or measurable strength or amplitude is sent from transmitter 101d to receiver 102d. Any waveform of any shape or frequency may be used as the transmitted signal, including for example a square wave, a sine wave, any periodic signal, or an aperiodic signal. Transmitted signals may use any convenient frequency or frequencies. For example, transmitted signals may be radio waves, or waves in any other portion of the electromagnetic spectrum. The strength 801 of the received signal generally varies inversely with the distance 105d between the transmitter and the receiver. For example, using a far field approximation for a half-wave dipole antenna, the electric field strength at the receiver is approximately inversely proportional to the distance 105d:

$$E_\theta = -\frac{iZ_0 I_0 \cos\left(\frac{\pi}{2}\cos\theta\right)}{2\pi r \sin\theta} e^{i(\omega t - kr)}$$

In this formula, r is the distance 105d between the antenna and the receiver, θ is the angle between the receiver and the antenna's axis, $Z_0$ is the impedance of free space, $k=2\pi/\lambda$ where λ is the wavelength of the signal, and the feedpoint current is $I_0 e^{i\omega t}$. The time-averaged received energy flux density is proportional to the square of the E-field; hence it is inversely proportional to the square of the distance 105d. The signal analyzer can therefore estimate the distance 105d using the received signal strength 801.

Figure 9:
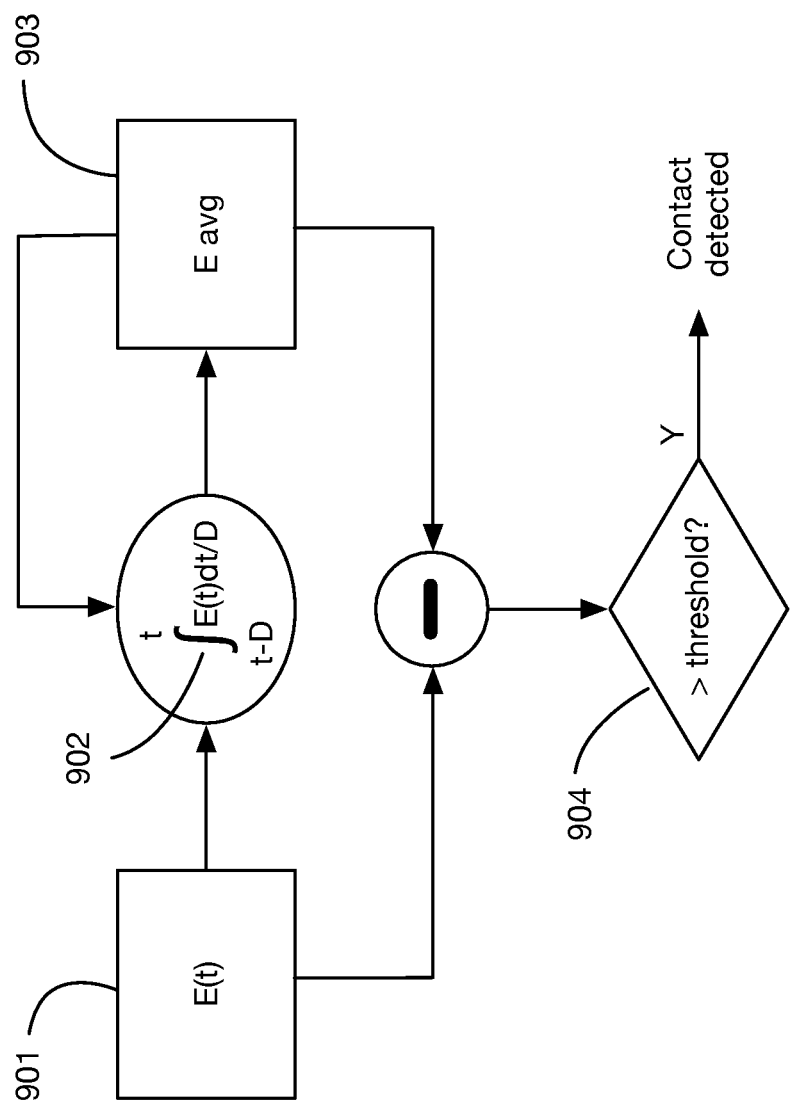
FIG. 9 illustrates an embodiment that uses a moving average as a baseline for received signal strength with no contact.

Direct use of inverse dependence of 801 on the distance 105d requires knowledge of the transmitted signal strength. One or more embodiments may use a transmitted signal of a constant, known amplitude, and compare the received signal strength to this known reference value. Alternatively, one or more embodiments may use an adaptive technique to detect changes in the received signal strength from a baseline value, independent of the transmitted signal strength value. This adaptive approach may in some cases provide a more robust detection of contact, since for example it may be less sensitive to small fluctuations or drift in the transmitted signal. FIG. 9 illustrates an embodiment that calculates a moving average of the received signal strength and detects contact when the instantaneous signal deviates sufficiently from this moving average. The signal strength 901 is averaged over a lagged time period 902 to form an average strength 903. FIG. 9 illustrates a simple moving averaging; one or more embodiments may use any technique to generate an adaptive reference signal, such as for example an exponentially weighted moving average or convolution with any desired function. The average value 903 is compared to the instantaneous value 901, and if the difference is greater than a threshold value 904, the system determines that contact has been made because the signal strength has changed, reflecting a change in distance between the transmitter and the receiver due to contact forces.

Figure 10:
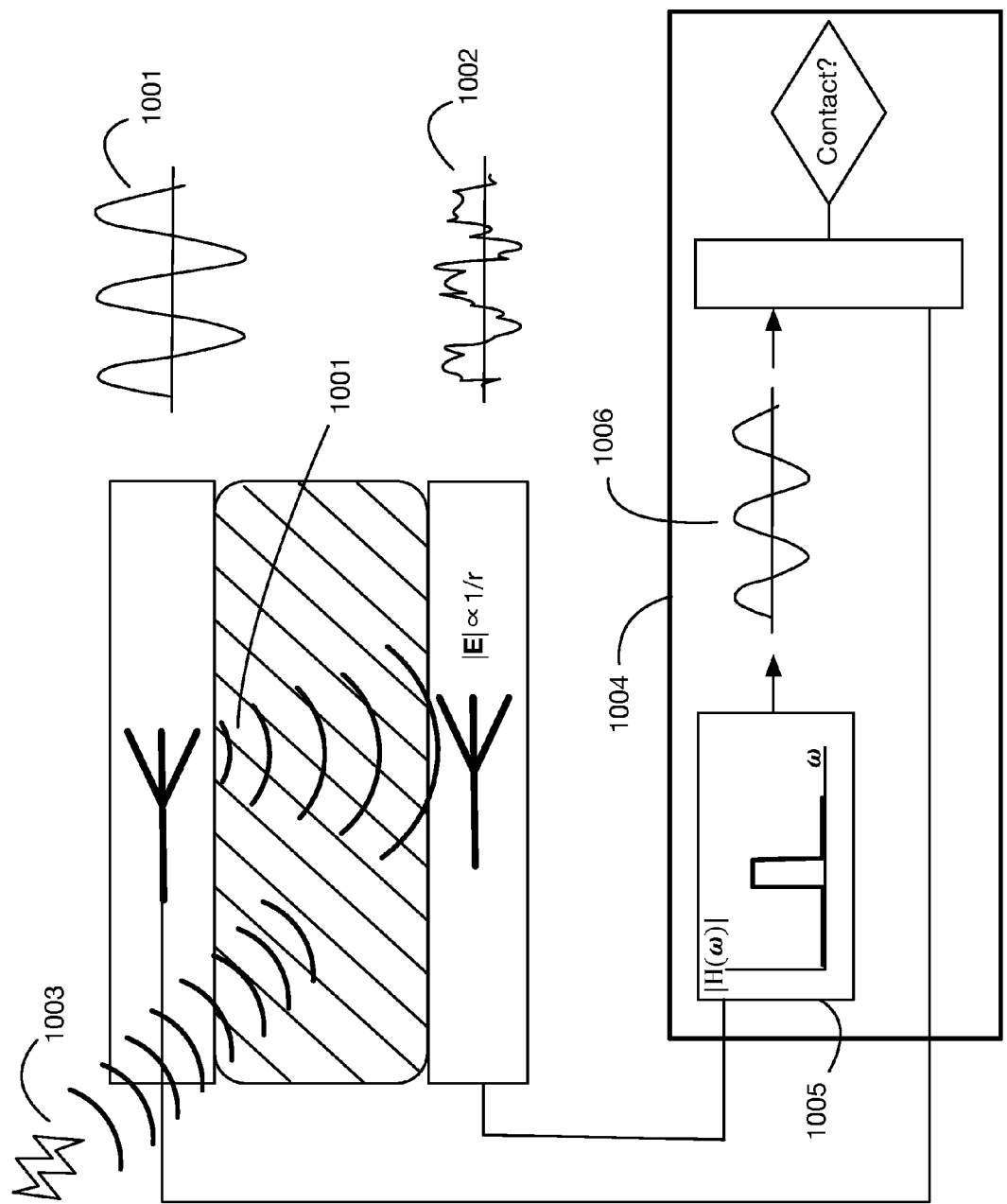
FIG. 10 illustrates an embodiment of the invention that applies a bandpass filter to a received signal to improve noise rejection.

One or more embodiments may encode, modulate, decode, demodulate, filter, or otherwise process signals to reduce the effect of electromagnetic noise on the detection of contact forces. For example, FIG. 10 illustrates an embodiment that sends a transmitted signal 1001 of a single frequency. The received signal 1002 is also affected by noise 1003. If the majority of the noise is not in the same frequency band as the transmitted signal 1001, the signal analyzer 1004 can remove all or most of the noise by filtering the received signal to extract only the transmitted frequency. In the example of FIG. 10, signal analyzer 1004 applies a bandpass filter 1005 to select the desired frequency, and then uses the signal strength of the filtered signal 1006 to detect contact. Filter 1005 may be constructed using any analog or digital filtering techniques known in the art. One or more embodiments may employ more complex approaches such as spread spectrum techniques or any other techniques known in the art to mitigate the effect of noise.

Figure 11:
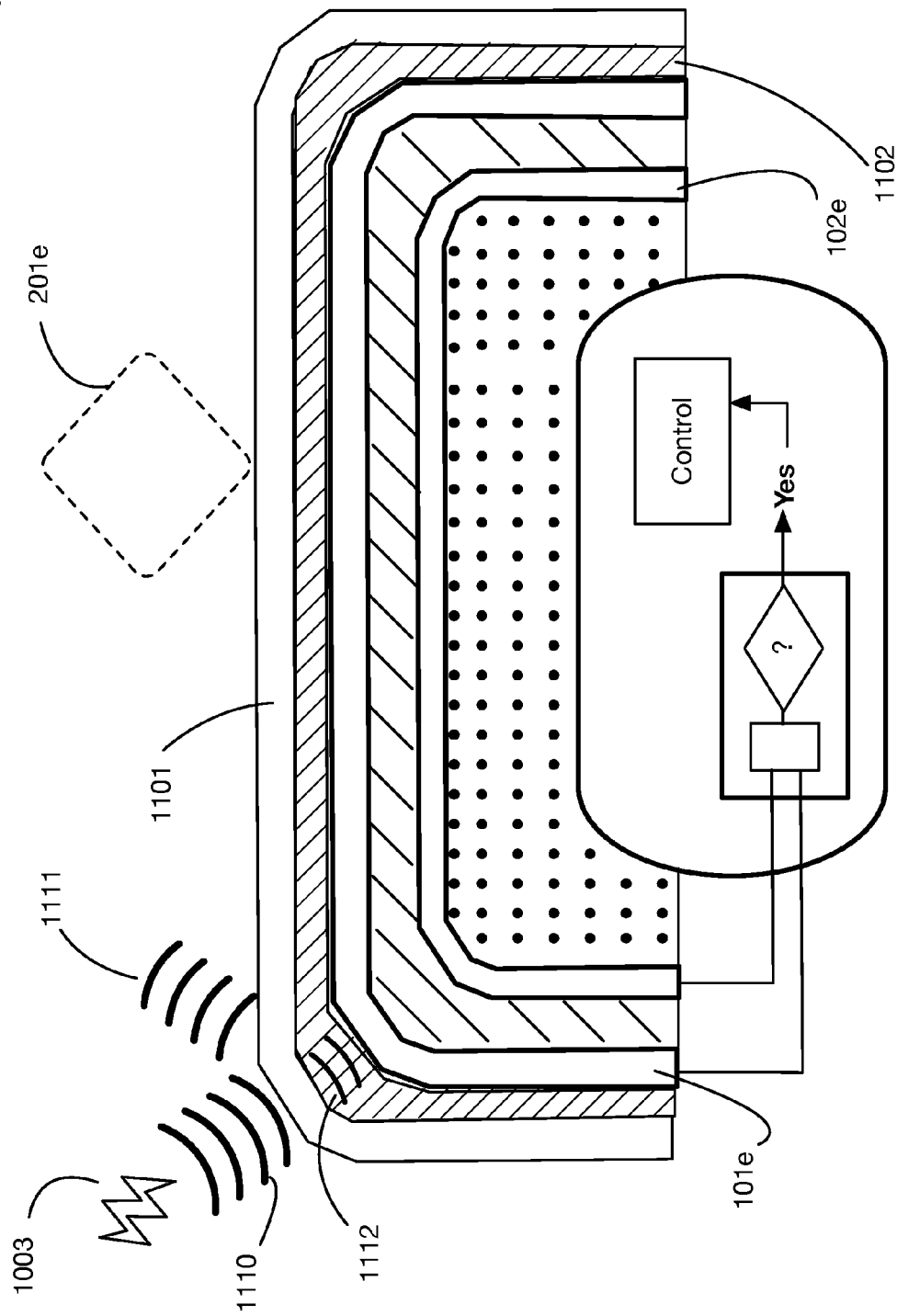
FIG. 11 illustrates an embodiment of the invention that includes a shield around the outer transmitter.

To eliminate or attenuate electromagnetic noise, one or more embodiments may shield the transmitter, the receiver, or both. FIG. 11 illustrates an embodiment similar to that shown in FIG. 4, with additional layers added to shield the transmitter and receiver from electrical and electromagnetic noise. In this example, transmitter 101e and receiver 102e are electrically conductive; hence they may receive unwanted electromagnetic noise such as noise from source 1003. A conductive shielding layer 1101 is added to the outside of the sensor, with an insulating layer 1102 between the shield and the transmitter 101e. The shielding layer may for example comprise a conductive enclosure, conductive foil or fabric, or conductive ink or paint applied to an outer surface. The insulating layer may for example be air or any insulating material such as a sheet of plastic like a urethane film. A shield may be grounded or not grounded, depending on the desired application. Shielding layer 1101 reflects or absorbs some or all of the electromagnetic radiation 1110 from noise source 1003; for example, in FIG. 11 most of the radiation 1110 is reflected as wave 1111, and a small amount of radiation 1112 penetrates through the shield. Capacitive coupling between a charged object 201e, which may occur without contact, also occurs with the shield instead of with the transmitter or receiver. One or more embodiments may employ multiple shielding or insulating layers of any desired size, shape, and conductivity. One or more embodiments may use no shielding, for example if the embodiment is designed to detect capacitive coupling with nearby objects that may not be in contact with the sensor.

Figure 12:
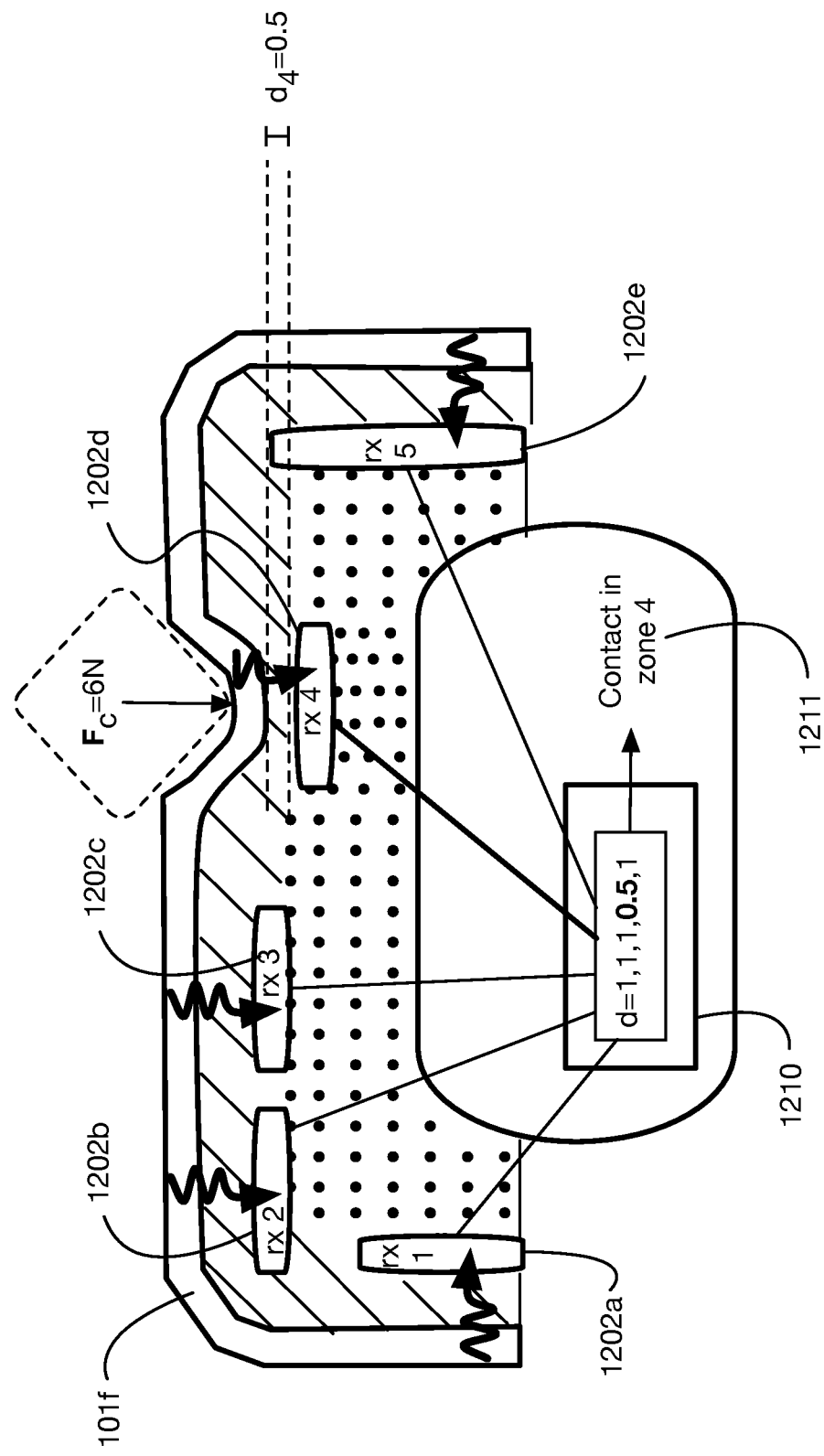
FIG. 12 illustrates an embodiment that uses multiple receivers to localize a contact.

One or more embodiments may divide the signal transmitter, the signal receiver, or both into multiple components, for example to detect the location or locations of a contact force. In one or more embodiments these components may not be connected either physically or electrically. FIG. 12 illustrates an embodiment with a single signal transmitter 101f and multiple signal receivers 1202a, 1202b, 1202c, 1202d, and 1202e. The signal analyzer 1210 is connected to each of the signal receivers. In one or more embodiments the signal analyzer may also be connected to the signal transmitter. Based on the signals received from each signal receiver, the signal analyzer determines which receiver or receivers, if any, indicate contact with an external object. In FIG. 12, signal analyzer 1210 determines that the distance between the receiver 1202d and the transmitter 101f is below the normal value, whereas the distance between the other receivers and the transmitter are normal. Thus it localizes the zone 1211 of contact between the sensor and the external object. In the example of FIG. 12, the signal transmitter is on or near the outside surface that contacts an external object; one or more embodiments may reverse this arrangement and place the transmitter on the inside, with multiple signal receivers on or near the outside surface.

Figure 13:
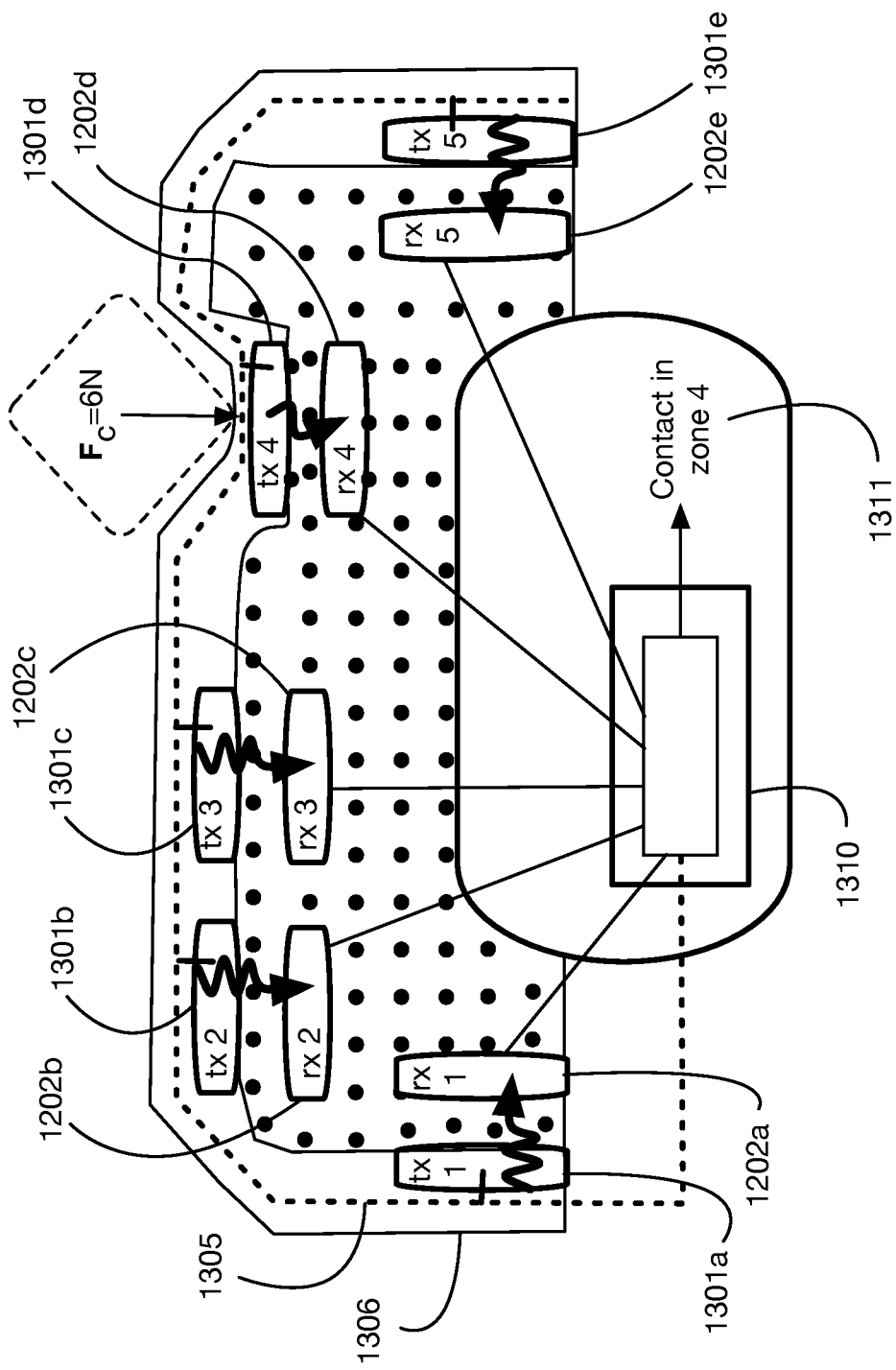
FIG. 13 illustrates an embodiment that uses multiple paired transmitters and receivers to localize a contact.

In one or more embodiments the transmitter and the receiver may both comprise multiple components, for example arranged in pairs. FIG. 13 illustrates an embodiment with 5 pairs of transmitting and receiving elements: 1301a and 1202a, 1301b and 1202b, 1301c and 1202c, 1301d and 1202d, and 1301e and 1202e. In this example the transmitters are also connected to the signal analyzer 1310 via a cable 1305 that runs through an outer enclosure 1306 containing the transmitters; the receivers are enclosed in an inner compliant layer. The signal analyzer analyzes the transmitted and received signals from all elements to determine the zone 1311 of contact.

Figure 14:
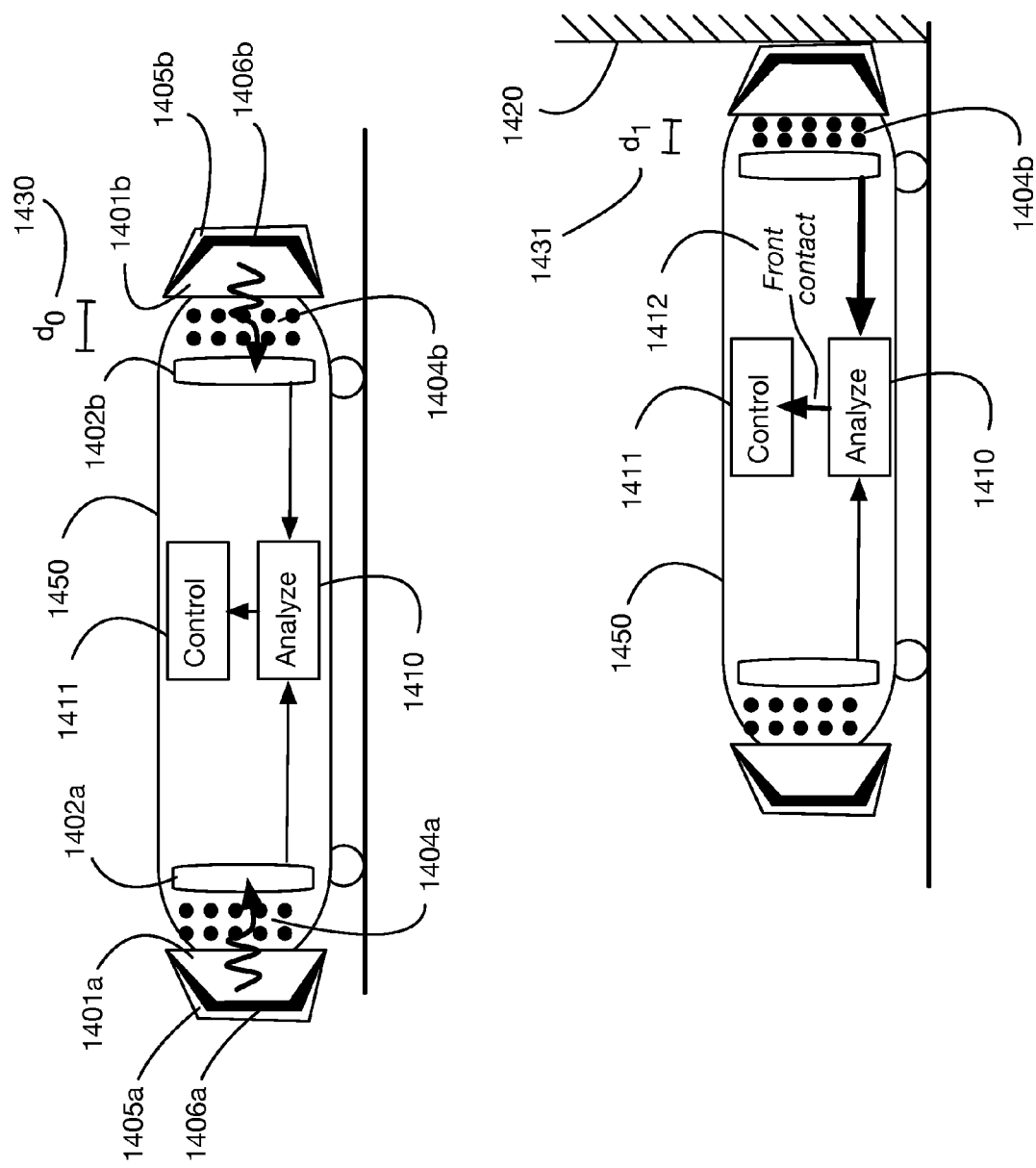
FIG. 14 illustrates an embodiment of the invention installed into bumpers on a mobile robot.

Embodiments of the sensor may be used in any application where detection of a contact or touch is desirable. One or more embodiments may install sensors on any equipment with moving components, and may for example integrate the contact detection signals with a control system that controls these components or that controls actuators that generate motion of these components. In particular, robots often require contact sensors for navigation, manipulation, or control. FIG. 14 illustrates an embodiment of the invention installed into bumpers of a mobile robot 1450. In this illustrative example, the robot 1450 has two sensing zones, one on the front bumper of the robot and one on the rear bumper. One or more embodiments may surround the entire external surface of a robot with one or more transmitters or receivers to detect contact in any location. In FIG. 14, transmitter 1401a and receiver 1402a detect contact at the rear, and transmitter 1401b and receiver 1402b detect contact at the front. 1401a and 1402a are separated by compliant layer 1404a; 1401b and 1402b are separated by compliant layer 1404b. Shield 1405a and insulator 1406a surround transmitter 1401a; similarly shield 1405b and insulator 1406b surround transmitter 1401b. Signal analyzer 1410 receives and analyzes signals from the front and rear sensors to determine whether and where contact occurs. It then sends contact information to the robot control system 1411, which may for example guide the robot to steer around obstacles or to reverse direction to back away from a barrier. The bottom half of FIG. 14 shows the robot 1450 making contact with wall 1420; this contact compresses layer 1404b, reducing the distance between front transmitter 1401b and front receiver 1402b from distance 1430 to distance 1431; this reduced distance is detected by signal analyzer 1410, which determines that the front bumper has contacted an object and sends this information 1412 to robot control system 1411.

Figure 15:
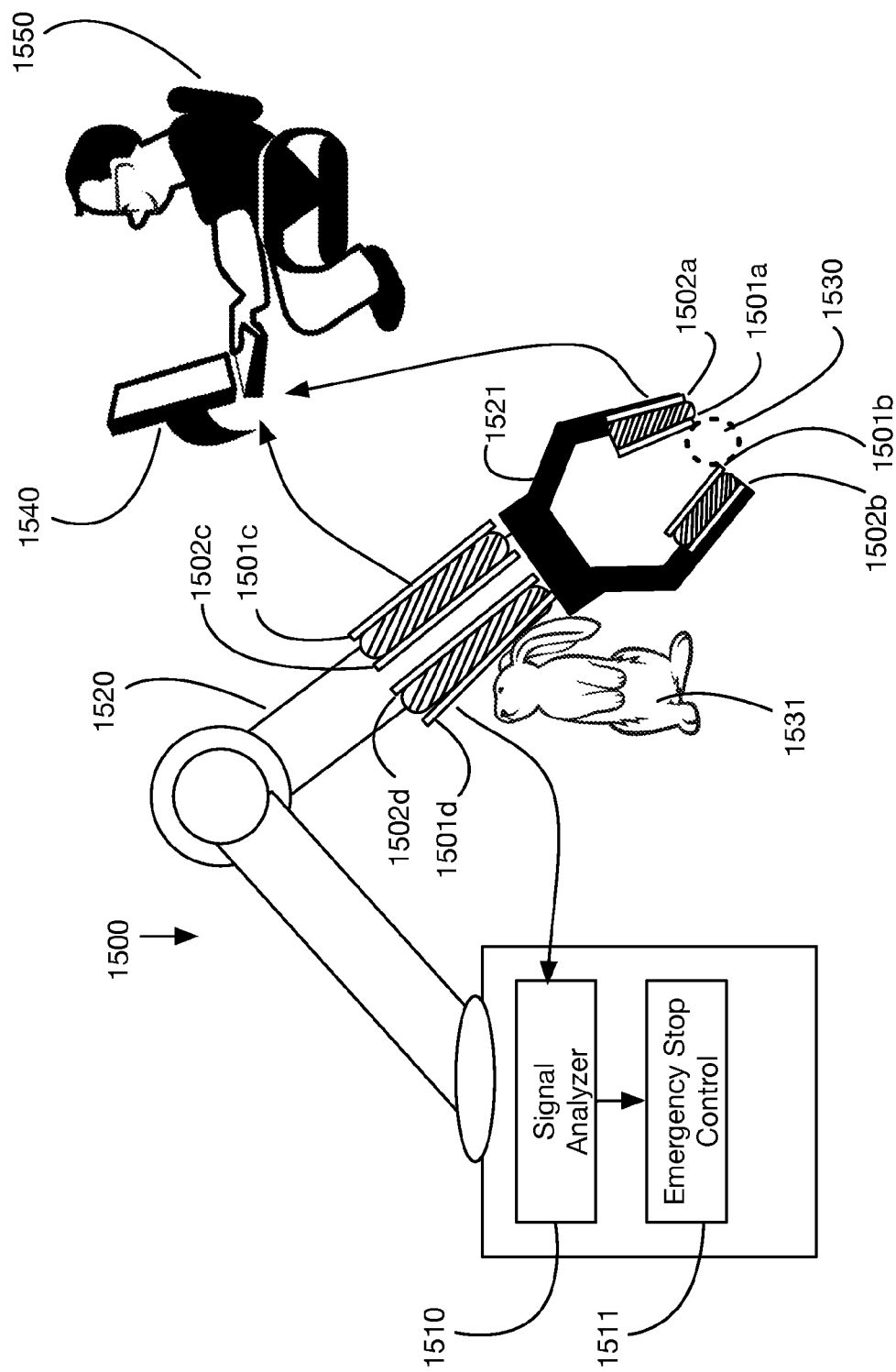
FIG. 15 illustrates an embodiment of the invention installed onto a gripper and onto an arm of an industrial robot, with sensor data sent to both a human operator and an automated control system.

One or more embodiments may install one or more contact detection sensors into robot arms or robot grippers, for either stationary or mobile robots. FIG. 15 illustrates an embodiment with a stationary robot 1500 that has a moveable robot arm 1520, and a gripper 1521 at the end of the arm 1520. Embodiments of the invention may be constructed in any size or shape and thus may cover any portion or all of any part of the robot to increase safety as desired. In this illustrative embodiment, sensors are installed into the gripper 1521 and onto the sides of the forward section of the robot arm 1520. Gripper 1521 has two sensors: a sensor with transmitter 1501a and receiver 1502a, and a sensor with transmitter 1501b and receiver 1502b. Arm 1520 has two sensors: a sensor with transmitter 1501c and receiver 1502c, and a sensor with transmitter 1501*d* and receiver 1502*d*. In each sensor the transmitter and the receiver are separated by a compliant layer. These configurations are illustrative; one or more embodiments may use any number of sensors in any desired arrangement to sense contact on any surface or surfaces associated with any component of a robot or of any other device or object. Information from the sensors is transmitted to computer 1540 that is used by operator 1550 to control the robot. For example, the operator computer may display information on whether each sensor has detected a contact, and potentially on details of the contact such as the location and force of the contact. In this example, the operator controls the robot to grasp object 1530 with the gripper 1521; data from the sensors 1501*a*/1502*a* and 1501*b*/1502*b* indicate whether the contact with this object has been detected by the sensors. The sensors on the arm 1520 may for example be used to detect inadvertent or potentially dangerous contact of the arm with other objects or personnel in the work area. In the example shown, bystander 1531 is accidentally in the vicinity of the robot arm, and the sensor comprising transmitter 1501*d* and receiver 1502*d* detects contact with this bystander. One or more embodiments may transmit sensor information or detection information from a signal analyzer to multiple destinations; in this example the sensor data or detection information is sent to both operator computer 1540 and to an automated control system that provides emergency stop functions for the robot 1500. For example, when sensor 1501*d*/1502*d* detects contact with bystander 1531, signal analyzer 1510 sends information to the automated emergency stop control 1511 that may for example stop motion of the robot arm 1520. This automated control may for example override the commands from operator 1550 to move the robot arm.

While the invention herein disclosed has been described by means of specific embodiments and applications thereof, numerous modifications and variations could be made thereto by those skilled in the art without departing from the scope of the invention set forth in the claims.

What is claimed is:

1. A compliant touch sensor comprising:
    a signal transmitter configured to emit an electromagnetic signal;
    a signal generator coupled to said signal transmitter and configured to generate a predefined transmitted signal having a predefined transmitted amplitude, wherein said transmitted signal is a radio wave frequency signal having a transmitted frequency;
    a signal receiver separated from said signal transmitter by a separation distance, wherein
        said signal receiver is coupled to said signal transmitter via an electromagnetic field; and,
        one or more attributes of said electromagnetic field depend on said separation distance,
            wherein said one or more attributes comprise a received amplitude representative of a field strength of the electromagnetic field as a received signal strength at said signal receiver;
    a compliant layer coupled to said signal transmitter and to said signal receiver, and located between said signal transmitter and said signal receiver, wherein
        said compliant layer comprises a dielectric material;
        said compliant layer deforms when a contact force is applied to said compliant layer or to a surface coupled to said compliant layer by an object;
        and, said separation distance changes when said compliant layer deforms in response to said contact force;
    a signal analyzer coupled to one or both of said signal transmitter and said signal receiver, and configured to analyze said one or more attributes of said electromagnetic field to detect said contact force to detect a displacement between the signal transmitter and the signal receiver,
        wherein said contact force is detected adaptively from a change in said received signal strength
            compared to a baseline reference value calculated when said compliant touch sensor is not in contact with said object or
            compared to a moving average calculated when said compliant touch sensor is not in contact with said object; and,
    an inner compliant layer coupled with either said signal transmitter or said signal receiver wherein said inner compliant layer is on an opposite side of either said signal receiver or said signal transmitter with respect to said compliant layer and an applied direction of said contact force;
    wherein both of said compliant layer and said inner compliant layer each comprise an Indentation Load Deflection rating of 0-10, and,
    wherein said signal analyzer
        applies an analog filter having a passband that includes said transmitted frequency to said electromagnetic field at said signal receiver to obtain a filtered signal; and,
        calculates said received signal strength from said filtered signal.

2. The compliant touch sensor of claim 1, wherein
    said compliant layer absorbs at least a portion of an impact energy generated by said contact force.

3. The compliant touch sensor of claim 1, wherein
    said signal analyzer detects said contact force when said separation distance reaches a detection distance; and,
    said compliant layer provides further deformation after said signal analyzer detects said contact force past a point at which said separation distance between the signal transmitter and the signal receiver reaches said detection distance, to reduce said separation distance below said detection distance.

4. The compliant touch sensor of claim 1, wherein said signal analyzer is further configured to calculate one or more of
    a location of said contact force;
    a magnitude of said contact force;
    a direction of said contact force; and,
    said separation distance.

5. The compliant touch sensor of claim 1, wherein
    said signal analyzer detects said contact force when said received signal strength differs from a reference received signal strength by an amount greater than said baseline reference value when said compliant touch sensor is not in contact with said object, wherein said reference baseline value comprises a threshold value.

6. The compliant touch sensor of claim 5, wherein
    said signal analyzer calculates said reference received signal strength from said moving average by averaging said received signal strength over an averaging time period when said compliant touch sensor is not in contact with said object.

7. The compliant touch sensor of claim 1, further comprising a conductive shield that prevents all or a portion of electromagnetic noise from reaching said signal transmitter, said signal receiver, or both of said signal transmitter and said signal receiver.

8. The compliant touch sensor of claim 1, wherein
said signal receiver comprises a plurality of receiving elements, each at a different location;
said one or more attributes of said electromagnetic field further comprise a plurality of parameters of said electromagnetic field, each parameter of said plurality of parameters corresponding to a receiving element of said plurality of receiving elements; and,
said signal analyzer analyzes said plurality of parameters of said electromagnetic field to determine which receiving element or receiving elements from said plurality of receiving elements are located near a location of said contact force.

9. The compliant touch sensor of claim 1, wherein
said signal transmitter comprises a plurality of transmitting elements, each at a different location;
said signal receiver comprises a plurality of receiving elements, each at a different location, each aligned with a corresponding transmitting element from said plurality of transmitting elements;
said one or more attributes of said electromagnetic field further comprise a plurality of parameters of said electromagnetic field, each parameter of said plurality of parameters corresponding to a receiving element of said plurality of receiving elements or to a transmitting element of said plurality of transmitting elements; and,
said signal analyzer analyzes said plurality of parameters of said electromagnetic field to determine which transmitting element or transmitting elements from said plurality of transmitting elements or receiving element or receiving elements from said plurality of receiving elements are located near a location of said contact force.

10. The compliant touch sensor of claim 1, wherein
said signal transmitter, said signal receiver, and said compliant layer are integrated into a device with one or more actuators; and,
said signal analyzer sends information on said contact force to a control system for said device that controls one or more of said one or more actuators.

11. The compliant touch sensor of claim 10, wherein said control system comprises a display that presents said information to a human operator.

12. The compliant touch sensor of claim 11, wherein
said device accepts commands from said human operator to control said one or more actuators; and,
said control system is configured to override said commands from said human operator based on said information from said signal analyzer via an emergency stop feature that automatically stops the device or stops said one or more actuators.

13. The compliant touch sensor of claim 10, wherein
said device is a robot;
said robot is a mobile robot; and,
said signal transmitter, said signal receiver, and said compliant layer are integrated into a bumper for said mobile robot.

14. The compliant touch sensor of claim 10, wherein
said device is a robot;
said robot has a gripper; and,
said signal transmitter, said signal receiver, and said compliant layer are integrated into said gripper and are configured to detect contact when said gripper grips an object.

15. The compliant touch sensor of claim 10, wherein
said device is a robot;
said robot has a moveable arm; and,
said signal transmitter, said signal receiver, and said compliant layer are integrated into said moveable arm and are configured to detect contact when said moveable arm touches an object.

16. The compliant touch sensor of claim 1, wherein said signal receiver comprises a plurality of receiving elements, each at a different location.

17. The compliant touch sensor of claim 1, wherein said inner compliant layer is configured to absorb over travel.

18. The compliant touch sensor of claim 1, wherein said inner compliant layer is air.

19. A compliant touch sensor comprising:
a signal transmitter configured to emit an electromagnetic signal;
a signal generator coupled to said signal transmitter and configured to generate a transmitted signal having a transmitted amplitude wherein said transmitted signal is a radio wave frequency signal having a transmitted frequency;
a signal receiver separated from said signal transmitter by a separation distance, wherein
said signal receiver comprises a plurality of receiving elements, each at a different location and wherein said signal receiver is coupled to said signal transmitter via an electromagnetic field; and,
one or more attributes of said electromagnetic field depend on said separation distance,
wherein said one or more attributes comprise a received amplitude representative of a field strength of the electromagnetic field as a received signal strength at said signal receiver;
a compliant layer coupled to said signal transmitter and to said signal receiver, and located between said signal transmitter and said signal receiver, wherein
said compliant layer comprises a dielectric material;
said compliant layer deforms when a contact force is applied to said compliant layer or to a surface coupled to said compliant layer by an object;
said separation distance changes when said compliant layer deforms in response to said contact force; and,
wherein said compliant layer comprises an Indentation Load Deflection rating of 0-10;
an inner compliant layer coupled with either said signal transmitter or said plurality of signal receivers wherein said inner compliant layer is on an opposite side of said signal receiver or said signal transmitter with respect to said compliant layer and an applied direction of said contact force,
wherein said inner compliant layer is configured to absorb over travel,
wherein said inner compliant layer is air, and,
wherein said inner compliant layer comprises an Indentation Load Deflection rating of 0-10;
a signal analyzer coupled to one or both of said signal transmitter and said signal receiver, and configured to analyze said one or more attributes of said electromagnetic field to detect said contact force to detect a displacement between the signal transmitter and the signal receiver, wherein said signal analyzer applies an analog filter having a passband that includes said transmitted frequency to said electromagnetic field at said signal receiver to obtain a filtered signal; and, calculates said a received signal strength comprising said received amplitude from said filtered signal;

wherein said contact force is detected adaptively from a change in said received signal strength comprising said received amplitude compared to a baseline reference value calculated when said compliant touch sensor is not in contact with said object or compared to a moving average calculated when said compliant touch sensor is not in contact with said object.

* * * * *